Patented Nov. 16, 1948

2,454,142

UNITED STATES PATENT OFFICE 2,454,142

ELECTROLYTIC RECOVERY OF ZINC

John T. Ellsworth, Collinsville, Ill.

No Drawing. Application February 16, 1942,
Serial No. 431,055

1 Claim. (Cl. 204—119)

This invention relates to the electrolytic recovery of zinc from zinciferous materials and has for its object the provision of certain improvements in the preparation of zinc-bearing electrolytes for electrodeposition. More particularly the invention contemplates an improved method for regulating the concentration in zinc-bearing electrolytes of certain soluble salts which exercise harmful effects during the preparation of the zinc-bearing electrolyte as well as during its electrodeposition when present in too high a concentration.

In the electrolytic recovery of zinc from zinciferous materials involving the treatment of the zinciferious material with a cyclic solvent solution and electrodeposition of zinc therefrom, certain soluble compounds (which for simplicity I shall herein call harmful soluble salts) tend to build up in the cyclic solution to concentrations that deleteriously affect the preparation of the zinc-bearing electrolyte and the electrodeposition of zinc. While I herein refer to these "salts" as "soluble," they may be, in reality, only slightly soluble in the cyclic solvents solution, but due to such low solubility they readily build up in the solution to their saturation points. The composition of these harmful soluble salts varies with the character of the zinciferous material undergoing treatment, but for the most part they are soluble compounds or forms of silica, alumina, iron, lime, magnesia and the like. When the concentration of these soluble salts in the solution approaches or reaches their saturation points, they probably are not entirely in solution, but are in part dispersed throughout the solution in a colloidal or gelatinous state. In any event, when present in too high a concentration, they hinder the efficiency of the normal chemical reactions (particularly the removal of copper and cadmium by zinc dust), the filtering of both leach and purification residues, and the electrodeposition of the zinc.

The average good grade of zinc concentrate or calcine does not usually contain the harmful soluble salts in any great amount, but where no positive steps are taken to eliminate them, they ultimately build up in the cyclic solution to their respective saturation points, and in automatic elimination in this manner they carry along a considerable amount of acid and water soluble zinc in various combinations and proportions therewith, thus causing a relatively high loss of zinc in proportion to their actual percentage content. A partial elimination of the harmful soluble salts takes place in the neutral leach and during the gradual cooling in the various storages, but these actions are never complete enough to avoid the harmful saturation effects during filtrations. Moreover, these salts are relatively less soluble in acid solution, and therefore during electrodeposition they tend to deposit on the electrodes of the electrolytic cell, thereby raising the resistance and temperature of the cell and lowering its efficiency.

In my United States Patent No. 1,429,330, patented September 19, 1922, I proposed to regulate the concentration of these harmful soluble salts by evaporating the zinc-bearing solution until a predetermined amount of the soluble salts have been precipitated, and, after removal of the precipitated salts, restoring to the solution an amount of water equivalent to that removed by evaporation. As a result of my continued investigations, I have found that moderate concentrations of the harmful soluble salts cause more trouble in the electrolytic zinc plant cycle than is generally realized, and that the deleterious effects of metallic impurities are secondary to and aggravated by the harmful effects of the soluble salts. I have also found that where the amount of the harmful soluble salts to be eliminated from the cyclic solution is small, as is usually the case in treating average good grade zinc concentrates or calcines, satisfactory adjustment or control of the concentration of the soluble salts during electrodeposition can be obtained by withdrawing or "bleeding-off" a small percentage of the zinc-bearing or pregnant solution which has been purified with respect to copper and cadmium, and evaporating the withdrawn solution to dryness. The zinc sulphate in the dried product of the evaporation step can be dissolved in water (without solution of the harmful soluble salts) and returned to the cyclic solution.

Based on the foregoing discoverey my present invention involves withdrawing or "bleeding-off" a small percentage (say 3 to 10%) of the purified zinc-bearing solution, evaporating the withdrawn solution to substantial dryness in the course of which a substantial part of the harmful soluble salts are rendered water insoluble without materially impairing the water solubility of the zinc content, and redissolving and returning to the cyclic solution the zinc content of the substantially dry product of the evaporation step. While the redissolved zinc may be returned to the cyclic solvent solution at any point in the cycle between leaching and electrodeposition, I prefer to return it to the pregnant solution from which the copper and cadmium have been removed, and to this end such an amount of water is used to redissolve the zinc as will result in a solution of substantially the same zinc content as the pregnant solution before such removal and evaporation to dryness of a part thereof. The principal objective of the treatment contemplated by the invention is to maintain in the zinc-bearing solution such a low concentration of the harmful soluble salts that filtering is free and rapid, removal of copper and cadmium by zinc dust is efficient, and electrodeposition of zinc takes place with high current efficiency.

In practicing the invention where the amount of the harmful soluble salts is small, the concentration of the salts during electrodeposition can usually be satisfactorily regulated or controlled by the continuous evaporation of from three to five per cent of the pregnant solution daily purified with respect to copper and cadmium, thus effecting the elimination of the harmful salts at a point where they can do no harm and as entirely insoluble compounds. The zinc sulphate in the dry product of the evaporation step is dissolved in water and returned to the cycle. Preferably, the amount of water used in this solution step is such that the concentration of zinc in the resulting solution is substantially the same as in the pregnant solution before withdrawal and evaporation to dryness of a part thereof, and the resulting solution may therefore be returned to the pregnant solution. With such removal of the harmful soluble salts, the manganese dioxide deposited in the electrolytic cells is perfectly soft, and no glue or goulack additions are necessary to correct bad film conditions on the electrodes.

The neutralization of the zinc-bearing solutions, at the end of the leaching step, is usually effected by the addition of fresh calcine, and in some cases by the addition of lime. The solution is then separated from the residue, usually by decantation or by filtration, or by a combination of both, and is then treated with metallic zinc (usually zinc dust) in the course of which any copper and cadmium are precipitated. The removal of the harmful soluble salts, in accordance with the invention, advantageously promotes this precipitation of copper and cadmium. Thus, I have found that if the harmful soluble salts are present in too high a concentration, e. g., at or near their saturation points, they interfere with the precipitation of copper and cadmium by zinc, and excessive amounts of zinc are necessary to effect the desired elimination of copper and cadmium. Concentrations of the harmful soluble salts at or near their saturation points also interfere with and retard filtration. It is my present belief that these harmful soluble salts, when present in such high concentrations, are probably not entirely in solution but are in part dispersed through the solution in a gelatinous or colloidal form, that deleteriously affects precipitation of copper and cadmium as well as any filtering operation. In any event, I do know that the removal of these harmful salts by evaporation of a small percentage of the purified pregnant solution promotes the precipitation of copper and cadmium as well as filtering.

The practical advantages of the invention obtained by withdrawing and evaporating to dryness a portion of the solution are illustrated by the following example:

A very basic zinciferous calcine could not be treated at all with the customary concentrations of zinc and acid (i. e. pregnant solution about 130 grams Zn per liter, and spent electrolyte about 110 grams $H_2SO_4$ per liter). When the zinc concentration of the purified pregnant solution was reduced to 65 grams per liter, and the spent electrolyte or tail solution contained 55 grams per liter of sulphuric acid, the current efficiency was 80%, and the zinc recovery to the cathodes was 75%. Applying the invention to the treatment of this same calcine by continuously withdrawing and evaporating 4% of the purified pregnant solution, it became possible to obtain a purified pregnant solution containing 125 grams of zinc per liter, and a spent electrolyte containing 110 grams of sulphuric acid per liter, with a current efficiency of 92% and a cathode zinc recovery of 92%, which represented 98% recovery of acid plus water soluble zinc in the original calcine.

I claim:

In the method of recovering zinc from zinciferous materials involving the treatment of the zinciferous material with a cyclic acid zinc sulfate solution and electrodeposition of zinc therefrom, the improvement in reducing prior to electrodeposition the concentration in the solution of soluble salts which exercise a harmful effect during electrodeposition when present in too high a concentration, which comprises withdrawing and evaporating to substantial dryness from about 3 to about 10 percent of the solution, in the course of which a substantial part of the harmful soluble salts therein is rendered insoluble without materially impairing the solubility of the zinc therein, leaching the dried residue of said evaporation with water to dissolve zinc sulfate therefrom, separating the dissolved zinc sulfate from the solid residue, and returning the separated dissolved zinc sulfate to the cyclic solution.

JOHN T. ELLSWORTH.

REFERENCES CITED

The following references are of record in the file of this patent:

UNITED STATES PATENTS

| Number | Name | Date |
|---|---|---|
| 1,154,602 | Best | Sept. 28, 1915 |
| 1,167,701 | Laist | Jan. 11, 1916 |
| 1,241,966 | Hanley | Oct. 2, 1917 |
| 1,429,330 | Ellsworth | Sept. 19, 1922 |
| 1,843,006 | Stevens | Jan. 26, 1932 |

FOREIGN PATENTS

| Number | Country | Date |
|---|---|---|
| 15,546 | Great Britain | 1913 |
| 361,258 | Germany | Oct. 12, 1922 |

Certificate of Correction

Patent No. 2,454,142.

November 16, 1948.

JOHN T. ELLSWORTH

It is hereby certified that error appears in the printed specification of the above numbered patent requiring correction as follows:

Column 4, line 27, after the word and period "calcine." insert the following paragraphs:

> The approximate cost of evaporating to dryness about 5% of the purified pregnant solution should be around $1.25 per ton of zinc produced. By such evaporation, zinc recoveries are raised and current efficiencies are increased by several per cent. Moreover, the invention results in many cases in a saving of as much as 60% in zinc dust consumption. Conservatively, these economies represent a reduction in cost of about 15% or around $7.50 per ton of zinc produced.
>
> This invention effects marked economies in the treatment of average good grades of zinc concentrates, and permits the treatment of other grades of zinc concentrates that cannot be economically treated by existing commercial practices.

and that the said Letters Patent should be read with this correction therein that the same may conform to the record of the case in the Patent Office.

Signed and sealed this 29th day of March, A. D. 1949.

[SEAL]

THOMAS F. MURPHY,
*Assistant Commissioner of Patents.*